No. 842,423. PATENTED JAN. 29, 1907.
G. RISCHMULLER.
TURBINE.
APPLICATION FILED APR. 2, 1906.
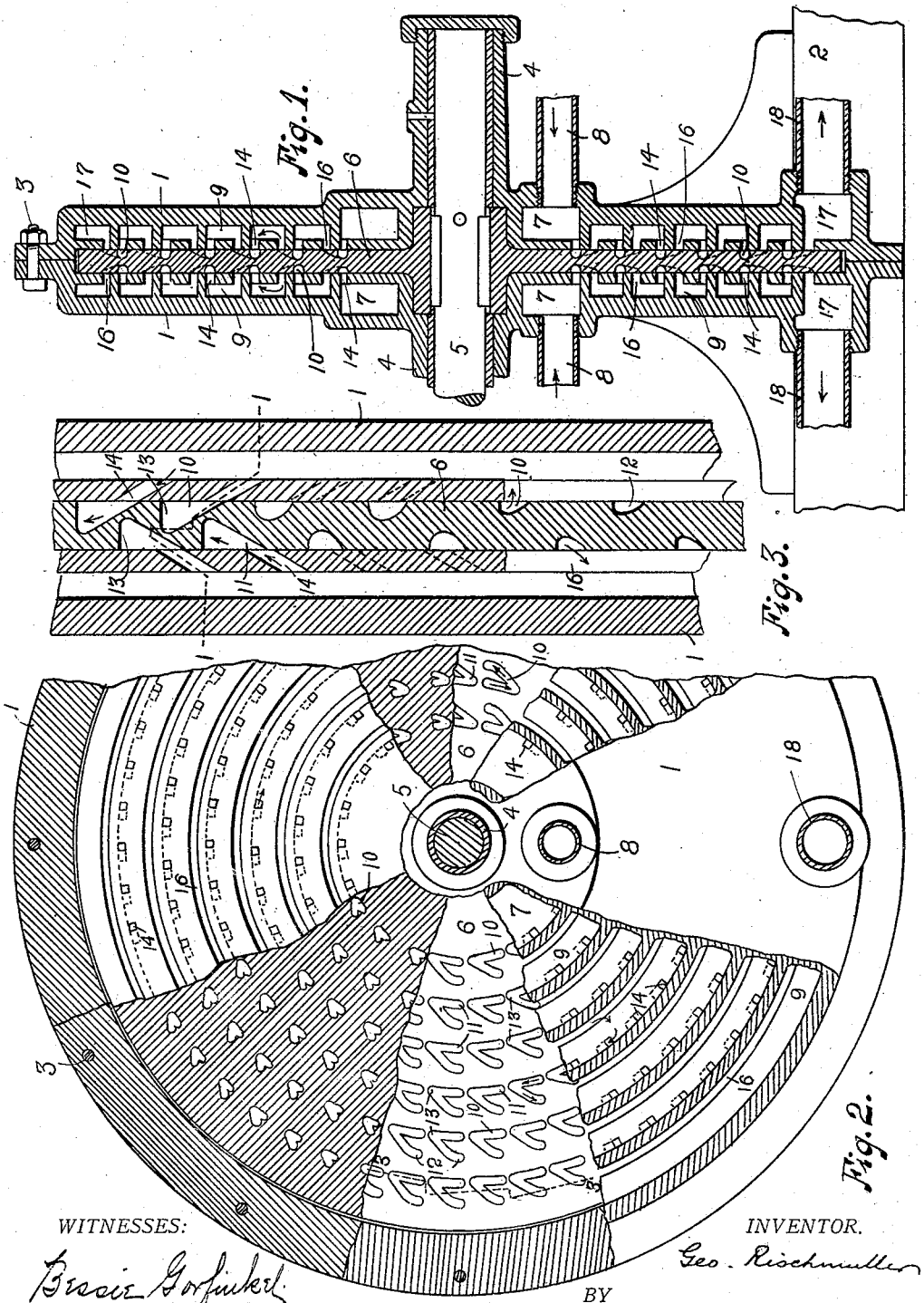
WITNESSES:
INVENTOR.
Geo. Rischmuller
BY
F. M. Wright
ATTORNEY.

UNITED STATES PATENT OFFICE.

GEORGE RISCHMULLER, OF SAN FRANCISCO, CALIFORNIA.

TURBINE.

No. 842,423.      Specification of Letters Patent.      Patented Jan. 29, 1907.

Application filed April 2, 1906. Serial No. 309,512.

*To all whom it may concern:*

Be it known that I, GEORGE RISCHMULLER, a citizen of the United States, residing at San Francisco, in the county of San Francisco, and State of California, have invented certain new and useful Improvements in Turbines, of which the following is a specification.

This invention relates to improvements in turbines, the object of this invention being, first, to provide a turbine which can be constructed at a comparatively small cost, requiring very little machining or fitting of parts; second, to provide one which will be as small and compact as possible for a given development of power and for this purpose to so construct it that at no time shall there be any dead steam contained in any of the recesses of the turbines not actually doing work in propelling the turbine; third, to provide one in which the recesses for admitting the steam shall vary but slightly in size and shall be distributed as evenly as possible over the surfaces of the moving member and yet at the same time allow for the expansion of the steam in passing from one series of recesses to another; fourth, to provide one in which the pressure on both sides of the movable member shall be evenly balanced, thereby avoiding any vibration or undue friction; fifth, to provide a construction in which the steam shall enter and leave the recesses in the most effective manner for imparting its momentum to the movable member.

In the accompanying drawings, Figure 1 is an axial section of the turbine. Fig. 2 is a side view of the turbine, parts being broken away in succession to show the interior. Fig. 3 is a projected sectional view on the line 3 3 of Fig. 2.

Referring to the drawings, 1 represents the casing-sections, bolted to a suitable base 2 and secured at their peripheries by bolts 3. In bearings 4 within said casing rotates the shaft 5, having secured thereto the rotary disk or runner 6.

Each casing-section is formed at its hub with an annular chamber 7, into which the live steam enters by a steam-pipe 8, and surrounding said steam-chamber is also formed in said casing-section a series of successive concentric annular steam-chambers 9 of uniform width. In each side of the rotary disk in a series of concentric rings are formed pockets 10, each pocket being approximately but not quite V-shaped and consisting of an inner impact side 11 and an outer escape side 12. The impact side of all pockets of the same circular group are in the form of an arc of a circle with the shaft 5 as center, while the escape sides 12 extend rearwardly from the corners 13 of the pockets at an angle of about forty-five degrees, at the extreme rear end being bent into a circular arc about the shaft as center. Futhermore, the impact sides of the pockets increase in depth from the entrance end to the impact-sides end, the inward slope of the bottom of each side from the plane of the disk being about thirty degrees. In like manner the bottom of each escape side of a pocket deepens gradually from its rear end to the impact corner 13.

The innermost annular steam-chamber 7 communicates with the impact sides 11 of the pockets on the same side of the disks by a series of oblique ducts 14, which are arranged about the shaft in a circle of the same diameter as the impact sides of the first circular group of pockets so as to register with the same and extend forward through the inner wall 7 of the casing at an angle of about thirty degrees, corresponding with the inward slope of the bottom of the impact side of the pocket. The steam escaping from said steam-chamber 7 through said oblique ducts strikes the corner angle of the pocket, the impact wall of which is formed approximately transverse to the disk, the steam thus imparting its momentum effectively to the disk. The steam then rebounds and escapes by the escape side of the pocket into a continuous annular port 16 formed in the inner wall of the casing and leading to the next outer annular steam-chamber 9. A great advantage is obtained by forming this port 16 continuous, for this permits of a very free and unobstructed escape of the steam from the pockets whatever be the position of the rotary disk. The steam now passes from the second annular steam-chamber 9 into the next circular group of pockets and escapes therefrom in the same manner as from the first series and in this way through the successive series of pockets and steam-chambers until it reaches the terminal exhaust-chamber 17, from which lead the exhaust-pipes 18.

The construction is the same on both sides of the rotary disk; but in order to provide as many pockets as possible in the disk without unduly weakening it the pockets of any concentric ring on one side are placed staggering or alternately with those of the concentric ring of the same diameter on the other side, as shown in Fig. 4, where the bottom or corner of each pocket on one side of the disk is shown as lying between the bottom or corners of two pockets in the ring of pockets of the same diameter on the other side. By this means each pocket can be given a depth of more than half the thickness of the disk, thus enabling the depth of the pockets and the area upon which pressure is exerted to be increased without unduly increasing the thickness of the disk.

For each ring of pockets and corresponding steam-inlets there are provided more pockets than steam-inlets; but the excess is slight, so that each pocket will have steam from a steam-inlet at all times—that is to say, the impact side of the pocket will be connected with the steam-inlet either at its front end or at its rear end, and in some cases one steam-inlet will supply two pockets. This is permitted by reason of the fact that the length of the discharge end of each steam-inlet is greater than the distance between the inlet-openings of two adjacent pockets.

Now by my construction, in which the steam enters at the center of the casing and expands gradually as it passes to the periphery and there exhausts, a very slight increase in the size of the pocket is sufficient to take up the increase in the volume of the steam as it expands in escaping from any circular group of pockets to the next outer circular group, because the steam finds a larger number of pockets on account of the greater diameter of the circle of the group. Thus this increase in number of the pockets permits of the expansion of the steam without greatly increasing the size of the pockets. A corresponding increase in number is also permitted of the ducts leading to said pockets. Thus it is possible at all times to provide a sufficient number of ducts to supply at the same time all the pockets in the corresponding circular group of pockets. In consequence every particle of steam is at all times actively working, and as a result I obtain a high-power engine of small size and weight.

I claim—

1. A turbine comprising casing-sections, a shaft, a disk secured on said shaft and rotating between said sections, and having on each side a concentric series of annular groups of pockets, each pocket having an impact inner side each pocket opening its whole length into the side of the runner, the inner side being concentric to the runner and the outer side oblique thereto and an escape outer side, the adjacent casing-section having a corresponding concentric series of annular steam-chambers, a concentric series of annular groups of ducts registering with the inner sides of pockets of the respective groups, and leading from the outermost portions of the annular steam-chambers, said casing-section having also means for permitting escape of the steam from the escape sides of the pockets into a steam-chamber, the ducts in each group increasing in number from the center to the circumference, and means for admitting steam to the innermost steam-chamber at each side and exhausting it from the escape sides of the outermost group of pockets, substantially as described.

2. A turbine comprising casing-sections, a shaft, a runner secured on said shaft and rotating between said sections, and having on each side a concentric series of annular groups of pockets, each pocket having an impact inner side and an escape outer side, the adjacent casing-section having a corresponding concentric series of annular steam-chambers, a concentric series of annular groups of ducts registering with the inner sides of pockets of the respective groups, and leading from the outermost portions of the annular steam-chambers, the discharge end of any steam-duct being longer than the distance between adjacent pockets of a corresponding series to permit the ducts in succession to supply each two adjacent pockets with live steam, said casing-section having also means for permitting escape of the steam from the escape sides of the pockets into a steam-chamber, the ducts in each group increasing in number from the center to the circumference, and means for admitting steam to the innermost steam-chamber at each side and exhausting it from the escape sides of the outermost group of pockets, substantially as described.

3. A turbine comprising casing-sections, a shaft, a runner secured on said shaft and rotating between said sections, and having on each side a concentric series of annular groups of pockets, each pocket having an impact inner side and an escape outer side, the adjacent casing-section having a corresponding concentric series of annular groups of ducts registering with the inner sides of pockets of the respective groups, and leading from the outermost portions of the annular steam-chambers, said casing-section having also escape-passages from the escape sides of the pockets into the corresponding steam-chambers, sufficiently extensive, relatively to the distance between adjacent pockets, to permit continuous escape of steam from each pocket into the steam-chamber, the ducts in each group increasing in number from the center to the circumference, and means for admitting steam to the innermost steam-chamber at each side and exhausting it from the escape sides of the outermost group of pockets, substantially as described.

4. A turbine comprising casing-sections, a shaft, a disk secured on said shaft and rotating between said sections, and having on each side a concentric series of annular groups of pockets, each pocket having an impact inner side and an escape outer side, the adjacent casing-section having a corresponding concentric series of annular steam-chambers, a concentric series of annular groups of ducts registering with the inner sides of pockets, of the respective groups, and leading from the outermost portions of the annular steam-chambers, said casing-section having also a series of continuous annular passages for the escape of the steam from the escape sides of the pockets into a steam-chamber, the ducts in each group increasing in number from the center to the circumference, and means for admitting steam to the innermost steam-chamber at each side and exhausting it from the escape sides of the outermost group of pockets, substantially as described.

5. A turbine comprising casing-sections, a shaft, a runner secured on said shaft and rotating between said sections, and having on each side a concentric series of annular groups of pockets, each pocket having an impact inner side and an escape outer side, the adjacent casing-section having a corresponding concentric series of annular steam-chambers, a concentric series of annular groups of ducts registering with the inner sides of pockets of the respective groups, and leading from the outermost portions of the annular steam-chambers, the rear wall of the impact inner side of the pocket being substantially parallel with the direction of an adjacent duct in the corresponding group, and the front wall being substantially at right angles to the plane of the runner, said casing-section having also means for permitting escape of the steam from the escape sides of the pockets into a steam-chamber, the ducts in each group increasing in number from the center to the circumference, and means for admitting steam to the innermost steam-chamber at each side and exhausting it from the escape sides of the outermost group of pockets, substantially as described.

6. A turbine comprising casing-sections, a shaft, a runner secured on said shaft and rotating between said sections, and having on each side a concentric series of annular groups of pockets, each pocket having an impact inner side and an escape outer side, the adjacent casing-section having a corresponding concentric series of annular steam-chambers, a concentric series of annular groups of ducts registering with the inner sides of pockets of the respective groups, and leading from the outermost portions of the annular steam-chambers, each pocket being shallow at the rear end and increasing in depth at the front end to form an abutment extending from the deepest point of the pocket to the face of the runner and substantially transverse to the plane of the runner, said casing-section having also means for permitting escape of the steam from the escape sides of the pockets into a steam-chamber, the ducts in each group increasing in number from the center to the circumference, and means for admitting steam to the innermost steam-chamber at each side and exhausting it from the escape sides of the outermost group of pockets, substantially as described.

In witness whereof I have hereunto set my hand in the presence of two subscribing witnesses.

G. RISCHMULLER.

Witnesses:
 BESSIE GORFINKEL,
 F. M. WRIGHT.